United States Patent
Eitzert et al.

(10) Patent No.: US 12,348,116 B2
(45) Date of Patent: Jul. 1, 2025

(54) ROTOR FOR AN ELECTRIC MOTOR AND ELECTRIC MOTOR WITH A ROTOR

(71) Applicant: Robert Bosch GmbH, Stuttgart (DE)

(72) Inventors: Marco Eitzert, Schwenningen (DE); Soenke Schuch, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 18/062,430

(22) Filed: Dec. 6, 2022

(65) Prior Publication Data

US 2023/0198338 A1 Jun. 22, 2023

(30) Foreign Application Priority Data

Dec. 17, 2021 (DE) .............. 10 2021 214 616.3

(51) Int. Cl.
*H02K 9/06* (2006.01)
*H02K 1/278* (2022.01)

(52) U.S. Cl.
CPC .............. *H02K 9/06* (2013.01); *H02K 1/278* (2013.01)

(58) Field of Classification Search
CPC ............ H02K 1/278; H02K 9/06; H02K 1/32; H02K 1/27; H02K 1/276; H02K 1/2706; H02K 1/2781; H02K 9/00; H02K 9/02; H02K 9/04
USPC .................................................. 310/156, 62
See application file for complete search history.

(56) References Cited

U.S. PATENT DOCUMENTS

| | | | | |
|---|---|---|---|---|
| 5,397,951 A * | 3/1995 | Uchida | ................. | H02K 1/278 310/91 |
| 5,631,512 A * | 5/1997 | Kawabata | .............. | H02K 1/278 310/156.15 |
| 9,819,235 B2 * | 11/2017 | Taniguchi | .............. | H02K 29/03 |
| 2007/0222317 A1 * | 9/2007 | Morel | .................... | H02K 1/278 310/156.01 |
| 2009/0224624 A1 | 9/2009 | Kumar et al. | | |
| 2009/0261677 A1 * | 10/2009 | Ishikawa | ................ | H02K 1/278 29/598 |
| 2011/0012462 A1 * | 1/2011 | Tsumagari | ............. | H02K 1/278 310/156.13 |
| 2013/0207508 A1 * | 8/2013 | Tomohara | ............ | H02K 1/2766 310/216.092 |
| 2015/0162789 A1 * | 6/2015 | Tanaka | ................... | H02K 1/278 310/156.28 |

(Continued)

FOREIGN PATENT DOCUMENTS

EP 2 897 262 A2 7/2015

*Primary Examiner* — Terrance L Kenerly
*Assistant Examiner* — Theodore L Perkins
(74) *Attorney, Agent, or Firm* — Maginot, Moore & Beck LLP

(57) ABSTRACT

A rotor for an electric motor includes a rotor core having a radius and a peripheral outer surface. The rotor further includes at least one air deflector element associated with the peripheral outer surface. The at least one air deflector element has at least one slope arranged at a predetermined angle to the radius. The at least one air deflector element is designed to deflect an air flow which occurs during a rotation of the rotor and flows along the peripheral outer surface counter to a direction of rotation of the rotor, at least partially in a flow direction oriented at least approximately perpendicularly to the peripheral outer surface.

8 Claims, 3 Drawing Sheets

(56) References Cited

U.S. PATENT DOCUMENTS

2016/0072346 A1\* 3/2016 Fischer .................. H02K 1/02
310/156.12
2020/0083766 A1\* 3/2020 Ueda ..................... H02K 1/223

\* cited by examiner

ROTOR FOR AN ELECTRIC MOTOR AND ELECTRIC MOTOR WITH A ROTOR

This application claims priority under 35 U.S.C. § 119 to patent application no. DE 10 2021 214 616.3, filed on Dec. 17, 2021 in Germany, the disclosure of which is incorporated herein by reference in its entirety.

BACKGROUND

The present disclosure relates to a rotor for an electric motor, comprising a rotor core having a radius and a peripheral outer surface.

Such a rotor for an electric motor, comprising a rotor core having a radius and a peripheral outer surface, is known from EP 2 897 262 A2. The rotor has additional vane elements on its end face for cooling the electric motor.

Furthermore, a rotor comprising a rotor core for an electric motor is also known from US 2009/0224624 A1. Inside, the rotor has a plurality of magnetic pockets. The magnetic pockets are arranged in a plurality of rows.

SUMMARY

The disclosure relates to a rotor for an electric motor, comprising a rotor core having a radius and a peripheral outer surface. At least one air deflector element is associated with the peripheral outer surface, wherein the at least one air deflector element has at least one slope arranged at a predetermined angle to the radius, and wherein the at least one air deflector element is designed to deflect an air flow, which occurs during a rotation of the rotor and flows along the peripheral outer surface counter to a direction of rotation of the rotor, at least partially in a flow direction oriented at least approximately perpendicularly to the peripheral outer surface.

With the disclosure, it is thus possible to provide a rotor in which a deflection of an air flow flowing along the rotor is effected by the at least one air deflector element, whereby an improved distribution of cooling air in an associated electric motor can be facilitated. In particular, cooling of the electric motor, preferably by the stator teeth associated with the electric motor, can be facilitated in this case.

The rotor core is preferably designed as a laminated core having a plurality of laminations.

Thus, a suitable rotor core can be provided in a simple manner.

Magnets are preferably associated with the peripheral outer surface, which magnets are arranged on the peripheral outer surface or are each at least partially arranged in a recess of the peripheral outer surface.

Thus, magnets can be arranged easily and straightforwardly on the rotor core.

Preferably, the at least one air deflector element is arranged between two magnets that are adjacent in the circumferential direction of the rotor.

A suitable arrangement of the at least one air deflector element on the rotor can thus be facilitated in a simple manner.

According to one embodiment, the at least one air deflector element is designed as a recess on the peripheral outer surface of the rotor.

Thus, a design of the at least one air deflector element can be facilitated easily and straightforwardly.

The at least one air deflector element preferably has a first slope having a first angle and a second slope having a second angle.

A secure and reliable deflection of the air flow and thus an improved cooling air distribution on the rotor can thus be facilitated.

The first angle and the second angle preferably have different values.

Thus, an application-specific embodiment of the at least one air deflector element can be facilitated.

A plurality of air deflector elements is preferably arranged on the peripheral outer surface in the circumferential direction of the rotor.

Thus, a deflection of the air flow at different positions on the peripheral outer surface for cooling the engine can be facilitated easily and straightforwardly.

According to one embodiment, all air deflector elements of the plurality of air deflector elements are at least approximately identical.

Thus, a rotor can be provided in a simple manner for improved cooling of the engine.

Preferably, all air deflector elements of the plurality of air deflector elements differ in design and are arranged alternately in the circumferential direction of the rotor.

An alternative rotor for cooling the motor can thus be provided easily and straightforwardly.

Furthermore, the present disclosure provides an electric motor comprising a rotor and a stator, wherein the rotor comprises a rotor core having a radius and a peripheral outer surface. At least one air deflector element is associated with the peripheral outer surface, wherein the at least one air deflector element has at least one slope arranged at a predetermined angle to the radius, and wherein the at least one air deflector element is designed to deflect an air flow, which occurs during a rotation of the rotor and flows along the peripheral outer surface counter to a direction of rotation of the rotor, at least partially in a flow direction oriented at least approximately perpendicularly to the peripheral outer surface toward the stator.

The disclosure thus makes it possible to provide an electric motor with a rotor, in which an improved distribution of cooling air can be facilitated by a deflection of an air flow flowing along the rotor on the at least one air deflector element. In particular, cooling of the electric motor, preferably by the stator teeth associated with the electric motor, can be facilitated in this case.

BRIEF DESCRIPTION OF THE DRAWINGS

The disclosure is explained in more detail in the following description with reference to exemplary embodiments shown in the drawings, in which.

DETAILED DESCRIPTION

Figure 1:
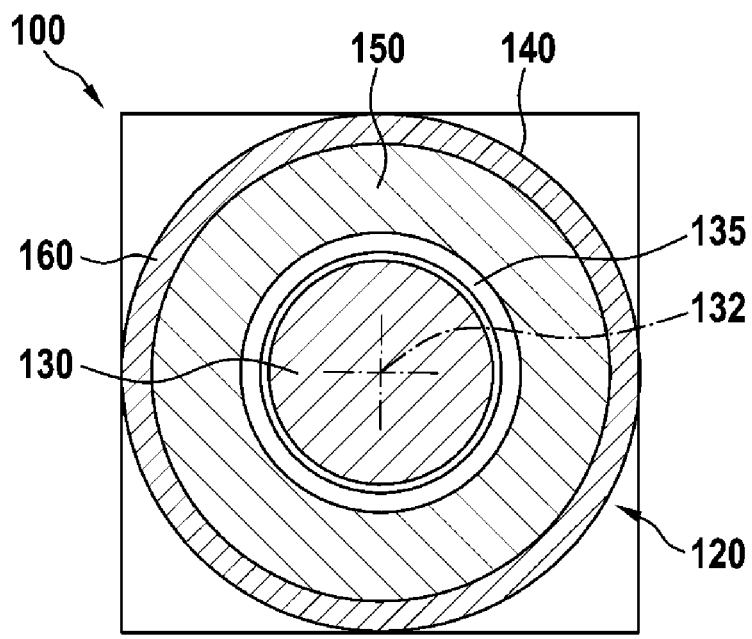
FIG. 1 is a schematic cross-sectional view of an electric motor having a rotor and a stator.

In the drawings, elements with the same or comparable function are provided with identical reference signs and described in more detail only once.

FIG. 1 shows an exemplary electric motor 100. The electric motor 100 is preferably designed as an electronically commutated motor. The electric motor 100 comprises a rotor 130, designed illustratively as an internal rotor, having a rotor axis 132, and a stator 120 having a stator core 140. The stator core 140 is provided, for example, at least in portions with a groove insulation 160, on which a stator winding 150 is illustratively arranged. An air gap 135 is formed between the stator 120 and the rotor 130.

It should be pointed out at this juncture that the electronically commutated electric motor 100 is shown only schematically in FIG. 1 since, from the prior art, the structural design and the detailed function of such a motor are sufficiently familiar to a person skilled in the art in the field of electronically commutated electric motors that here, for the purpose of conciseness and simplicity of the description, a more detailed description of the electric motor 100 is dispensed with.

Figure 2:
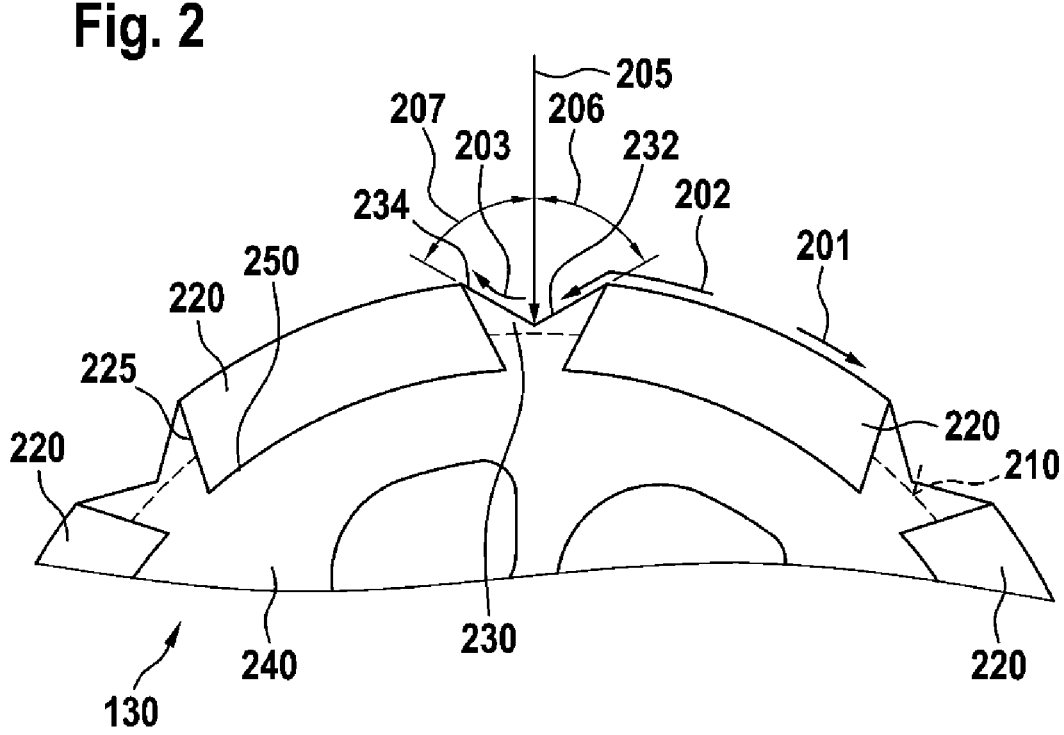
FIG. 2 is a plan view of a portion of a circular segment of the rotor of FIG. 1 with an air deflector element.

FIG. 2 shows the rotor 130 of FIG. 1 with its rotor core 240. The rotor 130 has a radius 205 and a peripheral outer surface 210.

According to one embodiment, the rotor core 240 is designed as a laminated core having a plurality of laminations. Alternatively, the rotor core 240 can also be designed as a soft iron core.

According to one embodiment, magnets 220 are associated with the peripheral outer surface 210 of the rotor 130. The magnets 220 are preferably arranged at least partially in recesses 250 of the peripheral outer surface 210. Alternatively, the magnets 220 can also be arranged, e.g. adhered, on the peripheral outer surface 210. Furthermore, the rotor 130 can also be formed without magnets on its peripheral outer surface 120. In this case, the magnets 220 can be designed as buried magnets. Furthermore, the electric motor 100 can be designed as a reluctance machine, wherein the rotor 130 does not comprise any magnets 210.

According to the disclosure, at least one air deflector element 230 (or 430 in FIG. 4; 530 in FIG. 5) is associated with the peripheral outer surface 210. The at least one air deflector element 230 (or 430 in FIG. 4; 530 in FIG. 5) is preferably designed to deflect an air flow 202, which occurs during a rotation of the rotor 130 and which flows along the peripheral outer surface 210 counter to a direction of rotation 201 of the rotor 130, at least partially in a flow direction 203 oriented at least approximately perpendicularly to the peripheral outer surface 210 toward the stator 120 of FIG. 1 or FIG. 3. This results in improved cooling of the stator 120 and stator teeth (321, 322, 323 in FIG. 3) associated with the stator 120. Preferably, the at least one air deflector element 230 (or 430 in FIG. 4; 530 in FIG. 5) has at least one slope 232, 234 (or 434 in FIG. 4; 532 in FIG. 5) arranged at a predetermined angle 206, 207 to the radius 205.

Preferably, the at least one air deflector element 230 (or 430 in FIG. 4; 530 in FIG. 5) is arranged in a gap 225 formed between two magnets 220 that are adjacent in the circumferential direction of the rotor 130. According to one embodiment, the at least one air deflector element 230 (or 430 in FIG. 4; 530 in FIG. 5) is designed as a recess on the peripheral outer surface 210 of the rotor 130. Alternatively, the at least one air deflector element 230 (or 430 in FIG. 4; 530 in FIG. 5) can also be designed as a separate element that is fastened to the peripheral outer surface 210 of the rotor 130.

According to the embodiment shown in FIG. 2, the at least one air deflector element 230 comprises the first slope 232 having the first angle 206 and the second slope 234 having the second angle 207. Illustratively, the first slope 232 has a positive incline and the second slope 234 has a negative incline.

Preferably, the first angle 206 and the second angle 207 have different values. The first angle 206 can be greater than the second angle 207. Alternatively, the second angle 207 can be greater than the first angle 206. According to a further embodiment, the two angles 206, 207 can also have the same values.

A plurality of air deflector elements 230 (or 430 in FIG. 4; 530 in FIG. 5) is preferably arranged on the peripheral outer surface 210 in the circumferential direction of the rotor 130. Illustratively, an air deflector element 230 is shown in each gap 225 shown. According to one embodiment, all air deflector elements 230 (or 430 in FIG. 4; 530 in FIG. 5) of the plurality of air deflector elements are at least approximately identical. Alternatively, the air deflector elements 230 (or 430 in FIG. 4; 530 in FIG. 5) of the plurality of air deflector elements can differ in design and can be arranged alternately in the circumferential direction of the rotor 130. Thus, for example, in the circumferential direction of the rotor 130, a first air deflector element can be formed according to the air deflector element 230 of FIG. 2, a second air deflector element according to the air deflector element 430 in FIG. 4 following in the circumferential direction, and a further air deflector element according to the air deflector element 530 in FIG. 5.

Furthermore, the plurality of air deflector elements can also be of a consistent shape, wherein a rotor core 240 can comprise, for example, the air deflector elements of the plurality of air deflector elements in the manner of the air deflector elements 230 (or 430 in FIG. 4; 530 in FIG. 5), but in this case the first and/or second angle 206, 207 of the individual air deflector elements 230 varies. Furthermore, an air deflector element 230 (or 430 in FIG. 4; 530 in FIG. 5) does not have to be arranged in each gap 225. For example, in the circumferential direction of the rotor 130, an air deflector element 230 (or 430 in FIG. 4; 530 in FIG. 5) can be arranged only in each second gap 225.

Figure 3:
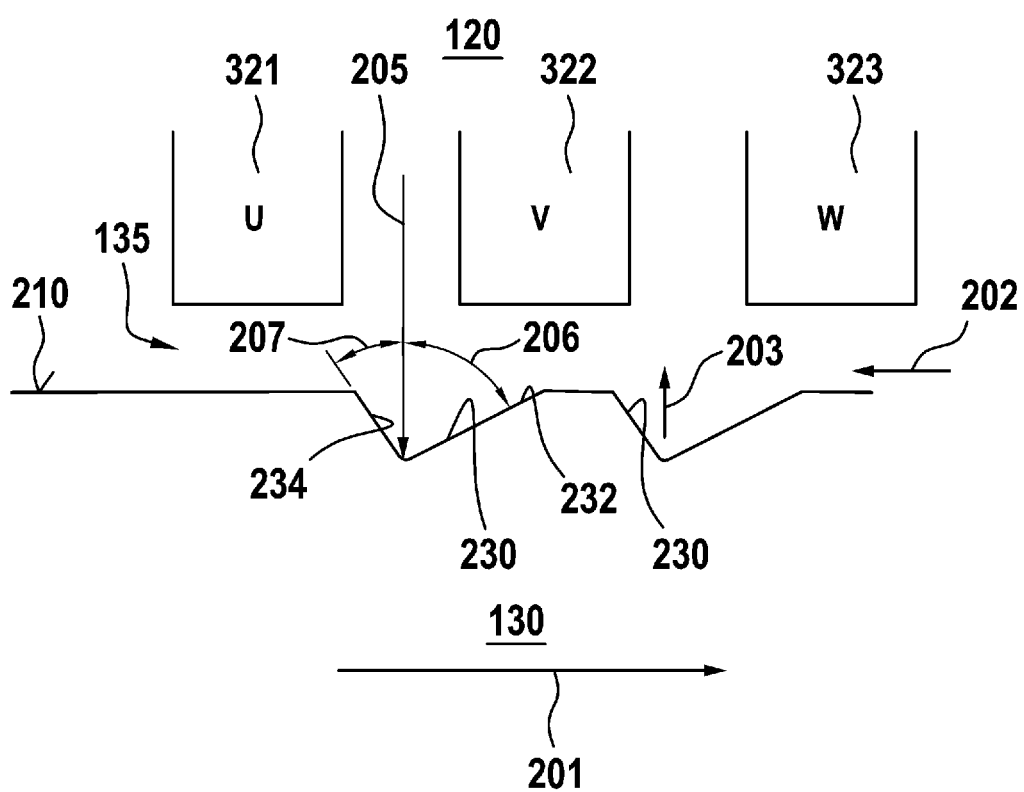
FIG. 3 is a schematic view of the stator of FIG. 1 and the rotor of FIG. 1 with an alternative air deflector element.

FIG. 3 shows the stator 120 of FIG. 1 with, by way of example, three stator teeth 321, 322, 323 and the rotor 130 of FIG. 1, which, in contrast to the rotor 130 of FIG. 2, is formed without magnets. It is noted that the rotor 130 may comprise buried magnets (not shown in FIG. 3). In FIG. 3, the air deflector elements 230 are designed, analogously to FIG. 2, as a recess on the peripheral outer surface 210 of the rotor 130. Illustratively, the angle 206 of slope 232, which, as described above, is formed toward the radius 205, is greater than the angle 207 of slope 234.

The air deflector elements 230 designed as a recess are preferably arranged in such a way that they lie in a commutation position of the rotor 130. This causes faster demagnetization during a commutation from one phase U, V, W to the following phase. The currents flowing in this case can thus be reduced and a thermal and/or electrical output power can thereby be minimized. It is pointed out that the recess for forming the air deflector element 230 can also be helical.

Due to the changed air routing or the deflection of the air flow 202 into the flow direction 203 oriented toward the stator 120, changed noises can occur during the operation of the electric motor 100, which noises can be used to acoustically signal certain operating states, for example. Furthermore, a motor fan for cooling the electric motor 100 can be omitted.

Figure 4:
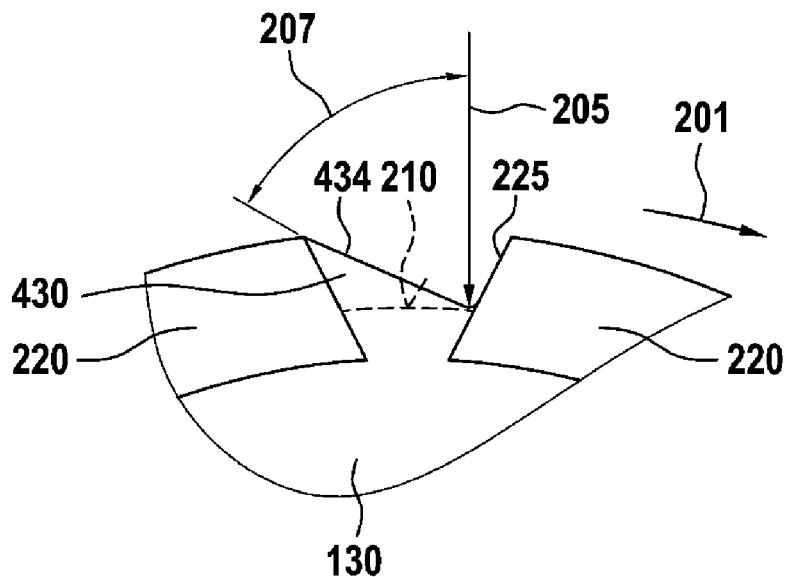
FIG. 4 shows an enlarged detail of the rotor of FIG. 2 with a further air deflector element.

FIG. 4 shows the rotor 130 of FIG. 2, which has an air deflector element 430 in the gap 225. The air deflector element 430 has only a single slope 434 having the angle 207 of FIG. 2. Illustratively, the slope 434 has a negative incline.

Figure 5:
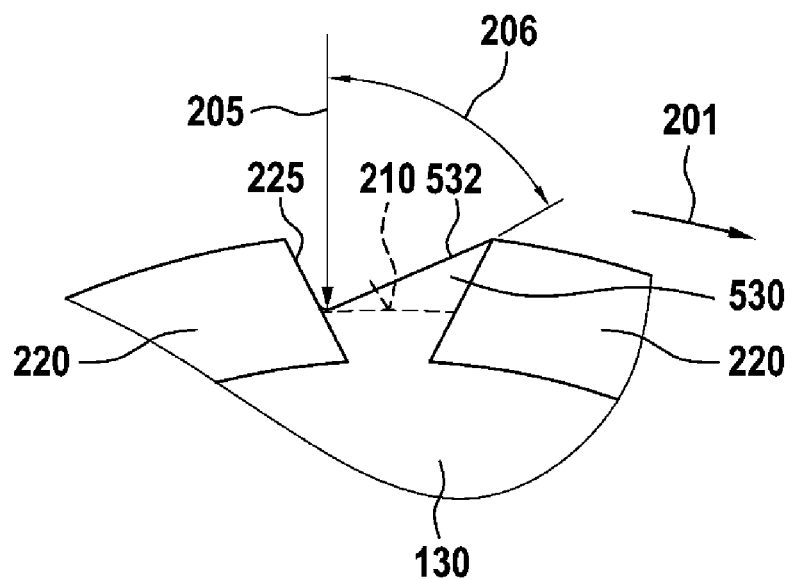
FIG. 5 shows an enlarged detail of the rotor of FIG. 2 with an alternative air deflector element.

FIG. 5 shows the rotor 130 of FIG. 2 having an air deflector 530 in the gap 225. The air deflector element 530 has only a single slope 532 with the angle 206 of FIG. 2. Illustratively, the slope 532 has a positive incline.

What is claimed is:

1. A rotor for an electric motor, comprising:
a rotor core having a radius and a peripheral outer surface;
at least one air deflector element associated with the peripheral outer surface; and
a plurality of magnets associated with the peripheral outer surface, wherein each of the plurality of magnets (i) is arranged on the peripheral outer surface, or (ii) is at least partially arranged in a recess of the peripheral outer surface,
wherein the at least one air deflector element has at least one slope arranged at a predetermined angle to the radius,
wherein the at least one air deflector element is configured to deflect an air flow which occurs during rotation of the rotor and flows along the peripheral outer surface counter to a direction of rotation of the rotor at least partially in a flow direction oriented at least approximately perpendicularly to the peripheral outer surface,
wherein each air deflector element of the at least one air deflector element is arranged so as to span an entire circumferential distance between two adjacent magnets of the plurality of magnets, and
wherein the at least one air deflector element includes a first slope having a first angle and a second slope having a second angle.

2. The rotor according to claim 1, wherein the rotor core is configured as a laminated core having a plurality of laminations.

3. The rotor according to claim 1, wherein the at least one air deflector element is configured as a recess on the peripheral outer surface of the rotor.

4. The rotor according to claim 1, wherein the first angle and the second angle have different values in relation to each other.

5. The rotor according to claim 1, wherein:
the at least one air deflector element includes a plurality of air deflector elements, and
each of the plurality of air deflector elements is arranged on the peripheral outer surface in the circumferential direction of the rotor.

6. The rotor according to claim 5, wherein each of the plurality of air deflector elements are at least approximately identical in configuration in relation to each other.

7. The rotor according to claim 5, wherein:
each of the plurality of air deflector elements differ in configuration in relation to each other, and
the plurality of air deflector elements is arranged alternately in the circumferential direction of the rotor.

8. An electric motor comprising:
a stator; and
a rotor comprising:
a rotor core having a radius and a peripheral outer surface;
at least one air deflector element associated with the peripheral outer surface; and
a plurality of magnets associated with the peripheral outer surface, wherein each of the plurality of magnets (i) is arranged on the peripheral outer surface, or (ii) is at least partially arranged in a recess of the peripheral outer surface,
wherein the at least one air deflector element has at least one slope arranged at a predetermined angle to the radius,
wherein the at least one air deflector element is configured to deflect an air flow which occurs during rotation of the rotor and flows along the peripheral outer surface counter to a direction of rotation of the rotor at least partially in a flow direction oriented at least approximately perpendicularly to the peripheral outer surface toward the stator,
wherein each air deflector element of the at least one air deflector element is arranged so as to span an entire circumferential distance between two adjacent magnets of the plurality of magnets, and
wherein the at least one air deflector element includes a first slope having a first angle and a second slope having a second angle.

* * * * *